March 9, 1943.　　　　M. A. EDWARDS　　　　2,313,527
VIBRATOR INVERTER SYSTEM
Original Filed May 27, 1939
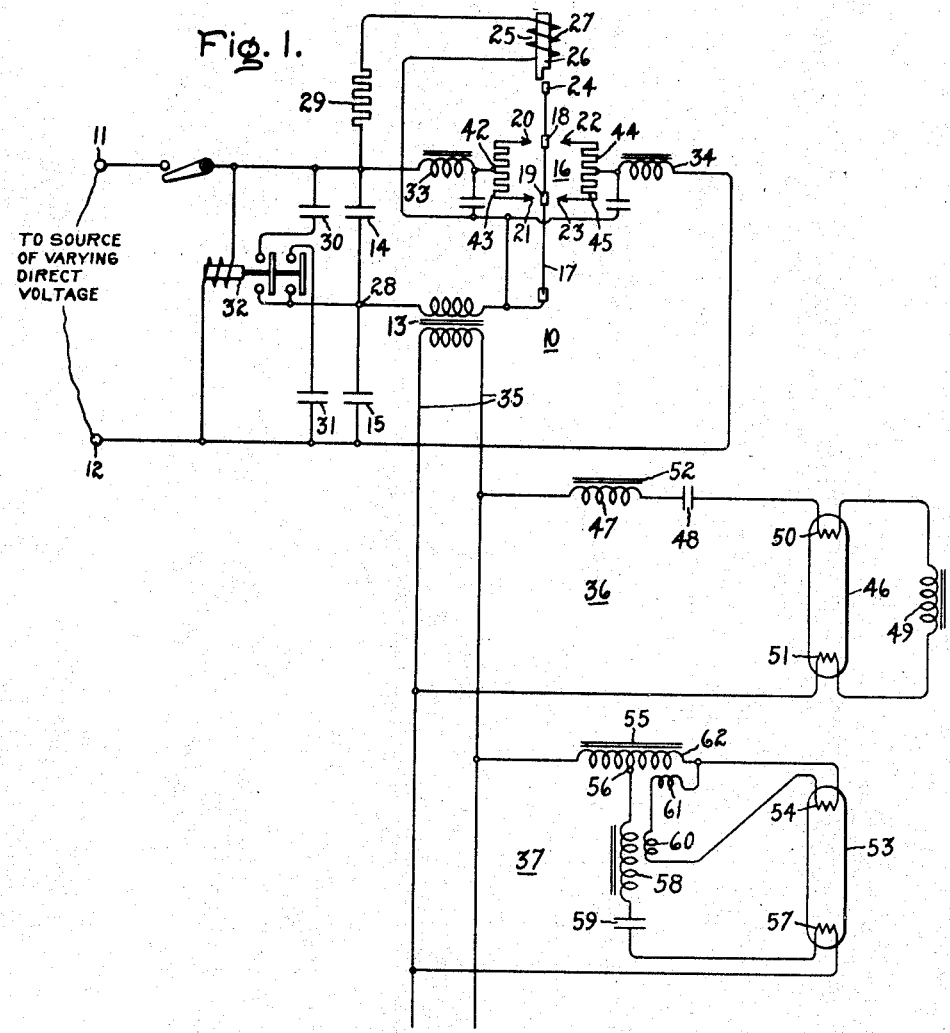
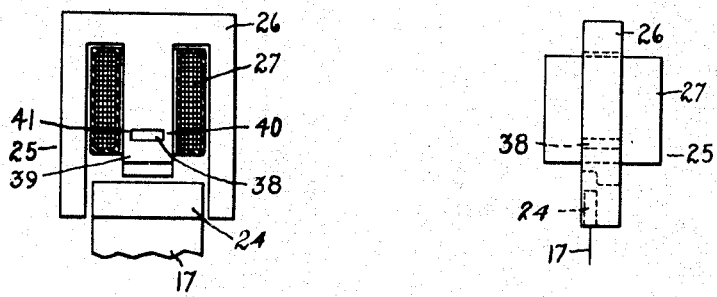
Inventor:
Martin A. Edwards,
by Harry E. Dunham
His Attorney.

Patented Mar. 9, 1943

2,313,527

UNITED STATES PATENT OFFICE

2,313,527

VIBRATOR INVERTER SYSTEM

Martin A. Edwards, Scotia, N. Y., assignor to General Electric Company, a corporation of New York Original application May 27, 1939, Serial No. 276,212, now Patent No. 2,284,407, dated May 26, 1942. Divided and this application December 23, 1940, Serial No. 371,448

3 Claims. (Cl. 175—365)

This application is a division of my application Serial No. 276,212, filed May 27, 1939, now Patent No. 2,284,407, assigned to the same assignee as the present application.

My invention relates to vibrator inverter systems for supplying alternating current load circuits from a direct current source such as a storage battery. The invention relates particularly to vibrator inverter systems for supplying railway-train lamps, especially of the fluorescent type, from the train current-generating equipment which includes, for example, a storage battery varying in voltage over wide limits with charge and discharge conditions.

It has been proposed to increase the illumination level in railway trains, without involving the expense of installing larger batteries and larger axle-driven generators, by employing lamps of the fluorescent type, which are of materially higher efficiency than lamps heretofore employed. These newer type lamps operate on alternating current and are preferably energized from the train batteries through inverter equipment of the vibrating switch type.

Difficulties have been encountered, however, in utilizing inverters of this type in connection with train illumination equipment by reason partially of the wide variations in battery voltage, which in the case of the iron-nickel battery, for example, ranges between approximately 27 volts and 43 volts for a battery rated normally at 32 volts. The battery voltage variations have tended to cause variations in amplitude of the inverter vibrating switch element and thereby to impair the operation of the inverter system. Further, the battery voltage variations have been accompanied by unduly wide variations in the inverter alternating output voltage and in the current flowing in the lamps.

Difficulties in utilizing inverters of the vibrating switch type in connection with train illumination have also been encountered at the vibrating switch contacts, which because of the relatively large currents employed are commonly preferably so arranged that two or more contacts carry current in parallel. By reason of unequal distribution of the current flowing through the paralleled contacts, heating and burning have occurred at those of the contacts which were overloaded.

It is an object of the invention to provide an improved vibrator inverter system, particularly for train illumination use, of high efficiency and of a high degree of reliability.

It is a further object to provide in a vibrator inverter system supplied from a varying voltage source, means responsive to the supply voltage variations to maintain substantially constant the amplitude of vibration of the vibrating element of the inverter.

It is another object to provide, in a system comprising alternating current load circuits supplied from a source of varying direct voltage through a vibrator inverter, means responsive to the voltage variations of the supply source to limit to a desired degree the corresponding variations in the alternating output voltage of the inverter and in the current flowing in the load circuits.

It is a further object to provide, in a train lighting system comprising lamps of the fluorescent type supplied through a vibrator inverter from the train-lighting storage battery, means associated with the lamp circuit to limit to a substantial degree the varying of the current flowing in the lamps as the voltage of the battery varies.

In accordance with my invention, variations in amplitude of vibration of the vibrating switch element, or reed, as the battery voltage varies are prevented by so arranging the driving coil for the vibrating reed that, as the battery voltage increases, the core of the driving coil saturates, the driving force exerted on the reed by the driving coil thereby tending to remain constant.

Unduly wide variations in the alternating output voltage and in the current drawn by the lamps, as the battery voltage varies, are prevented in accordance with the invention by employing two types of lamp circuits, one in which the current is largely limited by capacity and the other in which the current is limited by inductance. By proper proportioning of the magnetic circuits of the two types of lamp units, the power factor of the system is caused to approach unity as the battery voltage increases whereby a better regulation of the alternating voltage of the inverter is obtained and at the higher battery voltages the lamps are prevented from operating at too high a current value.

Heating and burning of contacts due to unequal distribution of current through banks of paralleled contacts in the vibrator are prevented in accordance with the invention by the provision of small resistances in series with the contacts, or the equivalent, whereby the currents through the paralleled contacts are equalized, the resistance loss, however, introduced by the resistances being so small that the overall efficiency of the inverter is affected to a negligible degree.

The novel features which are considered to be characteristic of my invention are set forth with particularity in the appended claims. My invention itself, however, both as to its organization and method of operation together with further objects and advantages thereof may best be understood by reference to the following description taken in connection with the accompanying drawing wherein Fig. 1 is a diagrammatic representation of an illumination system embodying my invention, and Figs. 2 and 3 are, respectively, cross-sectional and side elevational views on an enlarged scale of the vibrator driving coil and a portion of the vibrating reed of the inverter included in the system illustrated in Fig. 1.

In Fig. 1 the numeral 10 designates a vibrator inverter, preferably of a series type heretofore proposed, including input terminals 11 and 12 connected to a source of varying direct voltage which in the present embodiment is a storage battery, an output transformer 13, condensers 14 and 15 connected in series across the input terminals, and a vibrator device or vibrating switch 16. The latter device includes a vibratile element 17 carrying a bank of movable contacts 18 and 19, two banks of fixed contacts 20, 21 and 22, 23 on opposite sides of the movable contacts, a tip or armature element 24 at the free end of the vibratile element 17, and a magnetic element 25 to drive the vibratile element 17 including a core member 26 mounted adjacent the armature 24 and an energizing coil 27 connected between one of the input terminals, as 11, and the vibratile element 17, the latter being connected through the primary winding of output transformer 13 to the midpoint 28 of the series connected condensers 14 and 15. A limiting or ballast resistance 29 is connected in series with the energizing coil 27 of magnetic element 25. The two banks of paralleled fixed contacts 20, 21 and 22,23 are connected respectively to the opposite input terminals 11 and 12. A second set of condensers 30 and 31 similar to condensers 14 and 15 may be provided, adapted to be connected respectively in parallel with the latter by a relay 32 responsive to voltage variations of the input voltage source. In order to lessen arcing at the contacts upon closing the vibrating switch 16, non-linear reactors 33 and 34 are preferably provided in series respectively with the banks of fixed contacts, the reactors providing a period of low current value when the contacts close the circuit. Such reactors are disclosed in combination with vibrator inverter circuits in application Serial No. 113,581, filed December 1, 1936, and assigned to the same assignee as the present application. Alternating voltage is impressed through a load circuit line 35 on a plurality of lamp circuits, two of which, 36 and 37 are shown in the figure.

In order to limit the variations in amplitude of vibration of the switch element 17 as the input voltage varies, as shown in detail in Figs. 2 and 3 in accordance with the invention a bridge gap 38 is provided in the main leg 39 of the magnetic driving unit 25 in such manner that as the voltage of the input source such as a train lighting battery, for example, increases, the small remaining sections, 40 and 41, at the gap 38, saturate, the saturation of the sections 40 and 41 being equivalent to increasing the air gap between the reed tip or armature 24 and the core 26 as the voltage impressed on the driving coil 27 increases.

In order to divide equally the current flowing through the paralleled contacts of the vibrating switch 16, small resistances 42 to 45 (Fig. 1) are connected respectively in series with the fixed contacts 20 to 23. In the present embodiment wherein the banks of fixed contacts comprise only two contacts each, the series resistance for the contacts may take the form of two resistors, as shown, one connected between contacts 20 and 21, the other connected between contacts 22 and 23. The pairs of resistors 42, 43 and 44, 45 are respectively included in oscillation circuits of the inverter apparatus, one of these oscillation circuits comprising condenser 14 and reactor 33 and the other comprising condenser 15 and reactor 34, the resistors providing a desirable degree of damping in these oscillation circuits.

Variation of the load current to an undesirable degree in the output circuit of the inverter as the direct input voltage varies, is prevented, in a manner to be explained hereinafter, by providing lamp circuits in pairs, one lamp of a pair being capacitively and the other inductively ballasted, two of these lamp circuits, 36 and 37 which constitute one pair of the total load, being shown in the drawing. Each of the circuits 36 and 37 comprises a lamp of the fluorescent type which, as is well known, requires for the starting of the discharge therein a higher voltage than that required to maintain the discharge after it has been started.

Circuits of the type designated by the numeral 36 are disclosed in my prior application, Serial No. 197,527, filed March 22, 1938. In circuit 36 the lamp 46 is connected to the output circuit of inverter 10 through ballast devices comprising the reactor 47 and the capacitor 48 in series. The reactor 47 and capacitor 48 constitute a circuit which is in a condition of partial resonance, that is the inductance and capacitance of the latter circuit are such that the circuit is partly tuned or, in other words, is operated off the resonance peak. Connected across the lamp 46 is a second reactor 49 in series with the electrodes 50 and 51. In accordance with my present invention the reactor 47 is of the non-linear type for a purpose to be described hereinafter, being so arranged that the core 52 tends to saturate as the current through the reactor increases, thereby reducing the inductance of the partially resonant circuit with increase of current therein.

Circuits of the type designated by the numeral 37 are disclosed in my prior application Serial No. 197,529, filed March 22, 1938. In circuit 37 the lamp 53 is connected at one of its electrodes, 54, to one of the output circuit lines 35 through a ballast reactor 55. At a point intermediate the ends of this reactor, shown by way of example as the mid-point thereof, is a tap 56 and connected between this tap and the other lamp electrode 57 and the other of the output circuit lines is a branch circuit constructed to have a leading power factor and comprising a reactor 58 and a capacitor 59, the latter reactor and capacitor being arranged in series. The reactor 55 thus constitutes a step-up transformer of which that part of the winding between the lines 35 and the point 56 is the primary and the entire winding is the secondary. To assist in preliminary heating of the electrode 54 when starting the lamp 53, preferably coils 60 and 61 are provided in series with the electrode 54 and respectively in inductive relation with reactor 58 and the section 62 of reactor 55 to which the electrode 54 is connected.

In operation of the illumination system illustrated in the drawing, varying direct voltage from the railway train storage battery or other similar source connected to input terminals 11 and 12 being supplied to the inverter 10 the vibratile element 17 of the vibrator 16 is started and maintained in vibration in a known manner by current supplied to the driving coil 27 of magnetic element 25. Movable contacts 18 and 19 engage alternately the fixed contact banks 20, 21 and 22, 23, and condensers 14 and 15 are charged periodically and are alternately discharged through the primary of transformer 13 thereby producing an alternating voltage, tending to vary correspondingly with the input voltage variations, in the load circuit supply lines 35. In case the direct supply voltage rises to a predetermined high value, relay 32 operates to connect the auxiliary condensers 30 and 31 in parallel respectively with condensers 14 and 15.

At low and normal values of direct input voltage impressed on the driving coil 27 of magnetic element 25, the current in the latter coil is of such value that the small sections 40 and 41 of core 26 are not saturated. The flux in the core under these conditions is of proper value to maintain a desired amplitude of oscillation of vibratile element 17, the armature or tip member 24 of which is mounted closely adjacent to the main and outer leg or legs of the core and in series with the small sections 40 and 41, in the flux path of the core. When the input voltage rises causing the current in coil 27 to rise, the increasing degree of saturation of the small sections 40 and 41 tends to increase the amount of leakage flux between the main and outer legs of the core in the region above the gap 38 and to prevent the rise of flux between the main and outer leg or legs of the core and the tip or armature 24 of the vibratile element 17. Therefore under conditions of high voltage impressed on coil 27 and correspondingly high current therein, by the provision of the saturable sections 40 and 41 of core 26 the amplitude of vibration of vibrator element 17 is maintained at approximately its proper normal value. When these sections of the core 26 saturate as described, due to the excessive voltage impressed upon the driving coil 27, and the impedance of the magnetic element 25 drops correspondingly, the extra voltage in the driving coil circuit appears across the ballast resistor 29.

When vibratile element 17 assumes its closed positions to cause the parallel movable contacts, 18 and 19 in the present embodiment, to move into momentary engagement with the banks of paralleled fixed contacts, the effect of differences in resistance to the flow of current at the several contact pairs in engagement is lessened to a suitable degree or made practically negligible by the resistors, as 42 to 45, which are connected respectively in series with the fixed contacts. In practice I have found that to cause the several paralleled pairs of contacts to divide the load properly, the resistance values of the resistors required in series with the contacts are relatively small. The damping provided by the resistors 42 to 45 in the oscillation circuits including condensers 14 and 15 and reactors 33 and 34 assists in smoothing out peaks in the wave form and, in general, in maintaining the required wave form in the output of the inverter.

At starting of the load circuit 36, the capacitor 48 and the reactor 47 constitute a circuit which is partly tuned, or in other words is operated off the resonance peak. As a result of this condition the voltage across reactor 49 at starting, and hence the voltage across the electrodes 50 and 51 of the lamp 46 is raised considerably above that of the output circuit 35 of the inverter 10, and is sufficient to start a discharge in this lamp. As soon as the discharge starts, the reactor 49 is substantially short circuited by the lamp inasmuch as the impedance of the lamp is materially less than that of the latter reactor. The lamp 46 continues to operate therefore on the circuit comprising substantially only the reactor 47 and capacitor 48. Since the reactance provided by the capacitor 48 predominates over the reactance provided by the reactor 47 the lamp 46 operates with capacitive ballast and hence the load circuit 36 draws a leading current from the supply circuit 35 of inverter 10.

At starting of the load circuit 37, the circuit constituted by that portion of the reactor 55 forming an auto-transformer, together with the reactor 58 and the capacitor 59 is partly tuned or in other words is operated off the resonance peak. The starting voltage then applied across the electrodes 54 and 57 is the vector sum of that of line 35 and the induced voltage of the reactor 55 due to the leading current drawn through the branch circuit comprising the reactor 58 and the capacitor 59. Having started, the lamp 53 continues to operate, with the reactor 55 in combination with reactor 58 and capacitor 59 as the effective ballast. The lamp 53 and that part of the reactor 55 between the tap 56 and the electrode 54 now form a shunt around the branch circuit comprising the reactor 58 and the capacitor 59 so that the current in the latter branch circuit is materially reduced but, nevertheless, is of such value that the capacitor 59 changes the power factor of the load circuit 37 to such an extent that the current drawn from the supply circuit 35 by load circuit 37 is less lagging than would otherwise be the case.

Load circuits 36 and 37 after starting now operate in parallel, the power factor in circuit 36 being leading and the power factor in circuit 37 being lagging. The constants of these paralleled circuits are such that the resultant power factor, or power factor of the total load, is preferably lagging under all conditions of the varying impressed voltage.

Let it be assumed first that the direct voltage impressed on the inverter input terminals 11 and 12 from the train lighting storage battery or other similar source has its minimum value or a low range of values. Under these conditions, the ballast elements, respectively capacitive and inductive, of the circuits 36 and 37 may have such values that the resultant power factor is for example, approximately 75 per cent lagging. Assuming, second, that the direct voltage impressed on the inverter input terminals 11 and 12 begins to rise and continues to rise toward its maximum range. Under these latter conditions, the current drawn by lamp 46 of circuit 36 increases slightly. Any increase, however, in the current flowing in the ballast circuit including reactor 47 tends to saturate the core 52, and at the higher range of impressed voltage the reactor 47 saturates sufficiently to reduce the inductance thereof materially. As the inductance in the capacitive circuit including reactor 47 and capacitor 48 thus decreases, the latter circuit therefore becomes still more capacitive. The resultant power factor due to the capacitive ballast of circuit 36 and the inductive ballast of circuit 37 therefore becomes less lagging, or in other words, approaches closer to unity. At the same time, by reason principally of the constant arc drop which is characteristic of the lamps employed, the power factor of circuit 37 becomes, as the impressed voltage rises, slightly less lagging thereby contributing to causing the resultant power factor of the total load to become less lagging. The effect of the above described ballast means of circuits 36 and 37 may be such that as the impressed direct voltage rises to its higher range the resultant power factor, approaching unity from its approximately 75 per cent value under low voltage conditions, becomes approximately 85 per cent. I have found that by arranging the load on inverter 10 in pairs of lamp circuits respectively capacitively and inductively ballasted such as circuits 36 and 37, and providing means to cause the resultant power factor of the load to approach unity with rise in impressed voltage, that the output alternating current may be regulated within a range satisfactory for the operation of the fluorescent lamps although the train lighting-battery voltage impressed on the inverter varies over a wide range.

While the invention has been described herein in connection with fluorescent lamps, the invention is not limited to such use but is applicable to apparatus employing various forms of electric gas discharge devices.

My invention has been described herein in a particular embodiment for purposes of illustration. It is to be understood, however, that the invention is susceptible of various changes and modifications and that by the appended claims I intend to cover any such modifications as fall within the true spirit and scope of my invention.

What I claim as new and desire to secure by Letters Patent of the United States is:

1. In a vibrator inverter, a vibratile element having an armature, means to drive said element comprising a core having a main leg and outer legs, the extremities of said legs being closely adjacent to said armature, and an actuating winding on said core, said core having an air gap therein remote from said extremities, the portion of said core about said gap being of small cross-sectional area relative to that of the remainder of said core to cause said portion to approach saturation as the current in said winding increases, said armature being in series with said portion of said core in the flux path thereof whereby with said increase of current the leakage current in said core is increased and increase of the flux in said armature is prevented.

2. In a vibrator inverter, a vibrator device including a vibratile element, a plurality of movable contacts mounted in parallel relation thereon, a plurality of fixed contacts corresponding respectively to said plurality of movable contacts, a source of direct voltage, an oscillation circuit including a capacitance in shunt with said source and an inductance in series therewith, means to move said movable contacts into engagement with the corresponding fixed contacts to close said circuit, and a plurality of resistors connected respectively in series with said plurality of fixed contacts and said inductance to divide equally the current flowing through said vibrator device and to damp the oscillations in said circuit.

3. In a vibrator inverter, a vibratile element and a driving element therefor comprising a core having a main leg and at least one outer leg and an actuating winding on said core, said vibratile element having an armature portion closely adjacent to the free ends of said legs, a portion of one of said legs remote from the free end thereof having a substantially reduced cross-sectional area adapted to approach saturation with increase of current in said winding to cause the leakage current in said core to increase and to prevent increase of the flux in said leg ends and said armature whereby the amplitude of vibration of said vibratile element is maintained substantially constant.

MARTIN A. EDWARDS.